Feb. 8, 1927. 1,616,692
S. B. HASELTINE
FRICTION SHOCK ABSORBING MECHANISM
Filed March 16, 1925 2 Sheets-Sheet 1
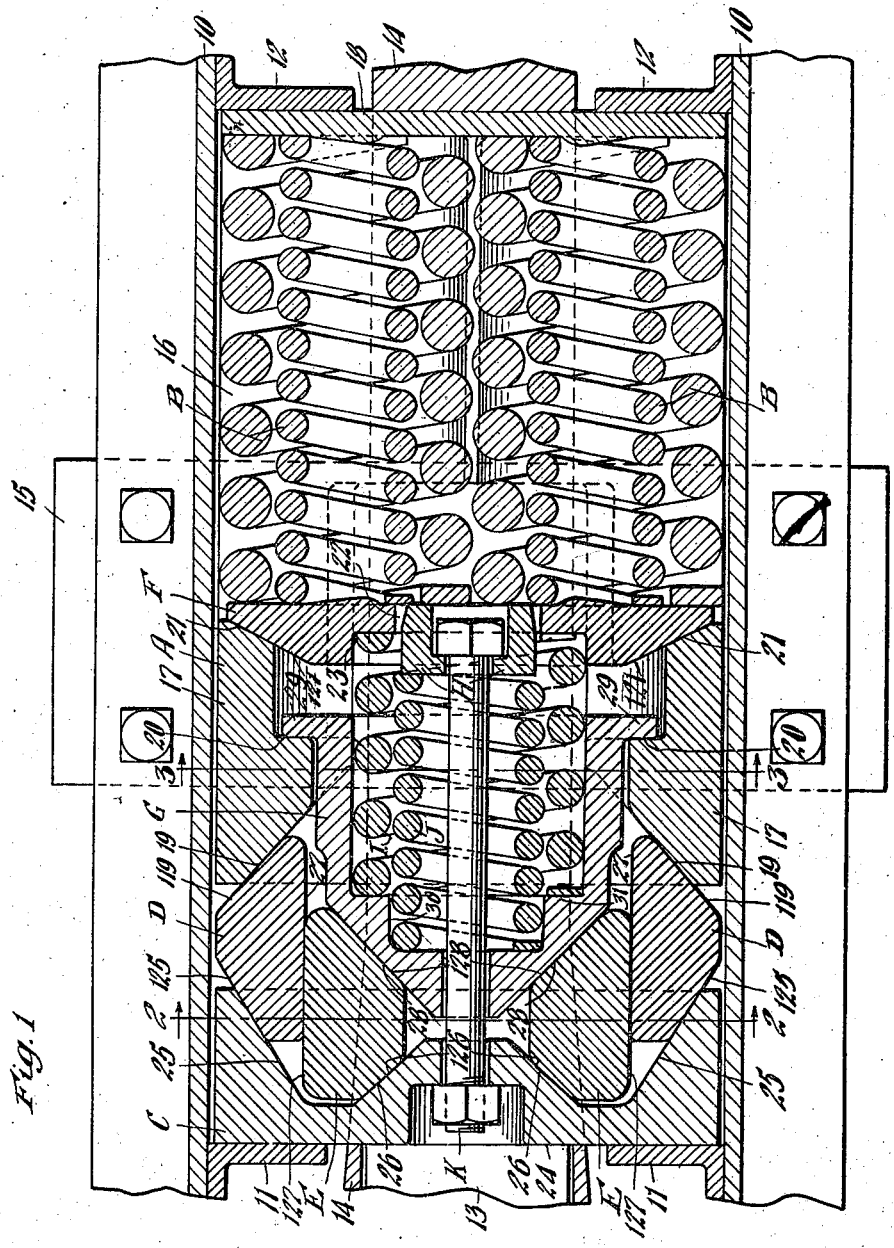
Witness
Wm. Geiger
Inventor
Stacy B. Haseltine
By Ge & Haight
Atty.

Feb. 8, 1927. 1,616,692
S. B. HASELTINE
FRICTION SHOCK ABSORBING MECHANISM
Filed March 16, 1925 2 Sheets-Sheet 2
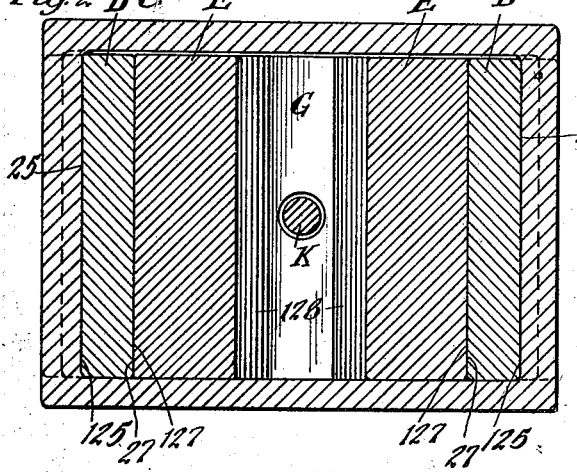
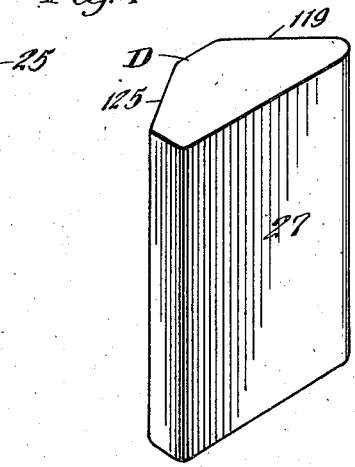
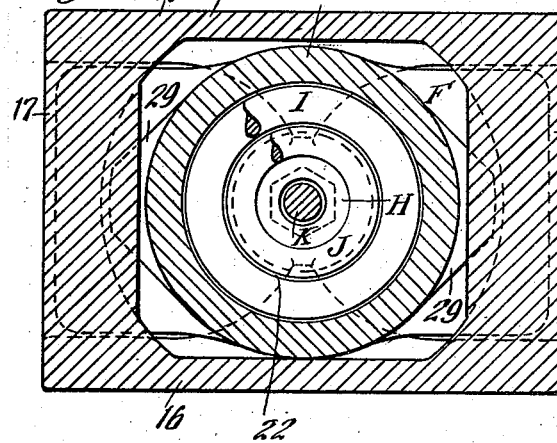
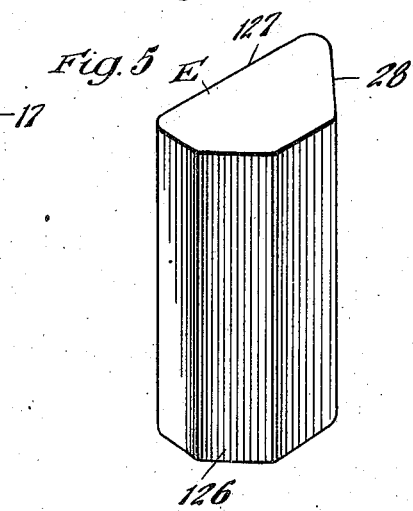
Witness
Wm Geiger
Inventor
Stacy B Haseltine
By George I Haight
His Atty.

Patented Feb. 8, 1927.

1,616,692

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 16, 1925. Serial No. 15,705.

This invention relates to friction shock absorbing mechanisms.

One object of the invention is to provide a high capacity friction shock absorbing mechanism having preliminary light action followed by heavier resistance during the remainder of the compression stroke of the mechanism.

Another object of the invention is to provide a mechanism of the character indicated, especially adapted for railway draft riggings, including a differential friction wedge system, a main spring resistance and an auxiliary spring resistance, wherein the spring resistance elements are successively operative to produce a light initial and a heavier final action.

Still another object of the invention is to provide a friction shock absorbing mechanism having differential action, including a friction system resisted by the usual spring elements and retaining means for holding the parts assembled and maintaining the mechanism of uniform, overall length while in full release, wherein the retaining means is designed to take care of the differential travel of the parts independently of the springs resisting the movement of the friction elements.

Other objects and advantages of the invention will more clearly and fully appear from the description and claims hereinafter following.

In the drawings, forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figures 4 and 5 are detailed, perspective views of a pair of friction wedge blocks used in connection with my improved mechanism.

In said drawings, 10—10 indicate channel-shaped center or draft sills of a railway car underframe, to the inner faces of which are secured front stop lugs 11—11 and rear stop lugs 12—12. The inner end of the drawbar is indicated at 13, to which is operatively connected a hooded yoke 14 of well-known form.

The shock absorbing mechanism proper is disposed within the yoke 14 and the yoke and the parts therewithin are supported in operative position by a detachable saddle plate 15.

The improved shock absorbing mechanism proper, as shown, comprises broadly, a spring cage casting A; twin arranged main spring resistance elements B—B; a main follower element C; two outer friction wedge blocks D—D; two inner friction wedge blocks E—E; a main spring follower F; an auxiliary spring follower cap G; a compensating spring follower H; an auxiliary spring resistance element I; a compensating spring J; and a retainer bolt K.

The spring cage casting A, as shown, is in the form of a hollow box-like member having top and bottom walls 16—16, relatively short, spaced, vertical side walls 17—17 and a transverse end wall 18. The sides of the spring cage are left open as shown, to permit the insertion of the spring follower and the twin arranged main spring elements. As clearly shown in Figure 1, the short side walls are disposed at the forward end of the casting and are relatively heavy. On the inner sides, the side walls 17 are provided with opposed, inwardly converging wedge faces 19—19. Inwardly of the wedge faces 19, the side walls are recessed as shown to provide transverse abutment shoulders 20 for a purpose hereinafter described. The inner ends of the side walls are beveled as indicated at 21, the beveled faces 21 cooperating with similarly beveled faces 121 on the front of the main spring follower F.

The main spring follower F is in the form of a relatively heavy plate having a central opening 22 therethrough adapted to freely accommodate the compensating follower H. At the forward side, the spring follower F is recessed as indicated at 23 to provide a seat for the inner end of the auxiliary spring resistance I.

The main spring resistance elements B are twin arranged and interposed between the main spring follower F and the transverse end wall 18 of the spring cage. Each member of the twin arranged spring resistance element B comprises an outer heavy coil and a relatively lighter inner coil.

The main follower element C has a flat end face 24 adapted to cooperate with the front stop lugs 11. The follower is provided with two sets of interior wedge faces 25—25 and 26—26, the wedge faces 25 being disposed outermost and diverging rearwardly of the mechanism. The inner set of wedge faces 26 converge rearwardly of the mechanism and are preferably disposed at a blunter angle with reference to the longtudinal axis of the mechanism than the wedge faces 25 for a purpose hereinafter described. The friction wedge blocks D and E are arranged in pairs at opposite sides of the mechanism. The friction wedge blocks D are of like construction, each being provided with a flat friction surface 27 on the inner side thereof and a pair of wedge faces 125 and 119 on the outer side thereof. The wedge face 125 of each shoe D cooperates with the wedge face 25 at the corresponding side of the main follower and is correspondingly inclined thereto. The wedge face 119 of each shoe D cooperates with and is correspondingly inclined to the wedge face 19 at the same side of the spring cage.

The friction shoes E are also of like construction, each having a flat outer friction surface 127 adapted to cooperate with the friction surface 27 of the corresponding shoe D. Each shoe E is also provided with a pair of wedge faces 126 and 28 at the inner side thereof, the wedge faces 126 of each shoe being correspondingly inclined to and adapted to cooperate with the inner wedge face 26 of the follower at the same side of the mechanism.

The spring follower cap G is in the form of a cup-shaped member having a pair of laterally extending lugs 29 at the rear end thereof adapted to cooperate with the shoulders 20 of the spring cage casting to limit the outward movement of the follower cap. At its forward end, the follower cap has a pair of forwardly converging faces 128—128 correspondingly inclined to and adapted to cooperate with the respective faces 28 of the inner friction blocks E. The interior of the spring cap G is counter-sunk as indicated at 30 to accommodate the front end portion of the compensating spring J. An annular shoulder 31 is thus provided forming a seat for the outer end of the auxiliary spring resistance I, the inner end of the latter being seated in the recess 23 of the main spring follower F. The compensating spring follower H is in the form of a thimble and bears on the inner end of the compensating spring J.

The parts are held in assembled relation by the retainer bolt K, which has its opposite ends anchored to the main follower element C and the compensating follower H respectively, the head of the bolt being seated in the recessed portion of the latter and the nut being accommodated in a recess provided therefor in the main spring follower element. When the parts are assembled, the bolt is so adjusted that the compensating spring J is under initial compression so that the wedge friction elements are at all times maintained in perfect contact. It will be evident that the compensating spring J holds the parts yieldingly in position independently of the remaining spring resistance elements of the mechanism, thereby taking care of differential travel of the parts independently of the other spring resistance elements, thereby preventing damage or breakage of the retainer bolt. It will also be evident that compensation for wear of the friction and wedge faces is taken care of by the spring J.

Upon reference to Figure 1, it will be seen that the inner end of the auxiliary spring follower cap G is normally spaced from the front face of the main spring follower F, thereby permitting a certain amount of initial compression of the auxiliary spring J before the main spring follower F is engaged by and moved with the follower cap G. In the normal position of the parts, the inner end of the main follower element is also spaced a predetermined distance from the outer end of the spring cage, this distance being equal to the full compression stroke of the mechanism. The main follower element C will thus engage the outer end of the spring cage when the mechanism is fully compressed, the latter acting as a column to transmit the actuating force.

The operation of the mechanism is as follows, assuming an inward or compression movement of the drawbar. As the drawbar is moved inwardly the follower C will be carried inwardly therewith, forcing the outer shoes D laterally toward the axis of the mechanism, and also carrying the same inwardly on the wedge faces 19 of the spring cage. As the blocks D approach each other laterally, the blocks E will also be forced inwardly toward the axis of the mechanism and due to the converging wedge faces 26 of the follower C will be carried sliding on the friction surface 27 of the blocks D. Due to the lateral inward movement of the blocks E, friction will also be created between the faces 126 and 26 of the blocks and main follower, respectively. As the blocks E approach each other laterally, the spring follower cap G will be squeezed out therebetween, compressing the auxiliary spring resistance element I. This action will continue until the inner end of tthe spring follower cap comes into abutment with the main spring follower F, whereupon the latter will be carried inwardly in unison with the spring follower cap, compressing the main spring resistance elements B. During this latter action, there will be substantially no further compression of the auxiliary spring. The differential action of the blocks D and E is taken care of by the compensating spring J as hereinbefore pointed out.

When the actuating pressure is reduced, the parts will all be restored to normal position by the main and auxiliary springs, outward movement of the follower C being limited by the retainer bolt K.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with relatively movable pressure transmitting elements; of a differential friction wedge system cooperating with said elements and interposed therebetween and adapted to be actuated upon relative approach of said elements; main and auxiliary spring resistance elements; and means cooperating with said springs for initially transmitting the pressure from said friction wedge system to the auxiliary spring and transferring the pressure to the main spring resistance after a predetermined compression of the mechanism.

2. In a friction shock absorbing mechanism, the combination with front and rear main follower acting elements; relatively movable toward each other, said follower elements having wedge means associated therewith; of differential wedge blocks cooperating with said wedge means; a main spring resistance; an auxiliary spring resistance, initially resisting movement of said blocks; and means cooperating with said blocks for transferring the actuating force from said auxiliary to said main spring resistance after a predetermined compression of the mechanism.

3. In a friction shock absorbing mechanism, the combination with front and rear follower acting elements relatively movable toward and from each other, said elements having wedge means associated therewith; of differential acting wedge means cooperating with said followers and adapted to be actuated upon relative approach of the same; spring resistance elements; and means for rendering said spring resistance elements successively operative to resist differential action of said wedge means.

4. In a friction shock absorbing mechanism, the combination with a spring cage, said cage having wedge means at one end thereof; of a follower acting member having wedge means thereon; differential wedge friction elements interposed between the wedge means of said follower member and cage; main spring resistance elements within said cage; a main spring follower; an auxiliary spring follower cooperating with said wedge friction elements, said auxiliary and main spring followers having limited relative movement; and an auxiliary spring resistance interposed between said auxiliary and main spring followers.

5. In a friction shock absorbing mechanism, the combination with a spring cage; of a front follower acting element, said cage and follower acting element being relatively movable toward and from each other; wedge means associated with said cage and follower element; a differential friction system cooperating with the wedge means associated with said cage and follower element; main and auxiliary spring resistance elements cooperating with said differential friction system; means for limiting separation of said spring cage and follower acting element, said last named means being yieldingly engaged independently of said main and auxiliary spring resistance elements.

6. In a friction shock absorbing mechanism, the combination with a spring cage having opposed, converging faces thereon; of a follower acting element having a plurality of wedge faces thereon; a plurality of wedge blocks arranged in pairs having cooperating friction surfaces, one block of each pair having wedge faces cooperating respectively with one of the faces of said cage and one of the faces of said follower acting element, and the other block of each pair having wedge faces, one of which cooperates with another of the wedge faces of said follower acting element; a spring follower cooperating with said last named block of each pair; spring resistance means cooperating with said spring follower; means for anchoring said follower acting element, said means including a retaining element connected to said follower acting element and an additional spring interposed between said retaining element and spring follower.

7. In a friction shock absorbing mechanism, the combination with a spring cage having interior opposed converging faces; of a follower acting element having two sets of opposed wedge faces, the faces of one set converging and the faces of the other set diverging inwardly of the mechanism; a plurality of sets of cooperating, relatively movable friction elements, one of the cooperating elements of each set having wedging engagement with one of the wedge faces of the cage, and one of the diverging wedge faces of the follower element and the other of said cooperating friction elements having wedging engagement with one of the converging faces of said follower element; and a main spring resistance within said cage opposing movement of said sets of cooperating friction elements.

8. In a friction shock absorbing mechanism, the combination with a spring cage having interior, opposed, converging wedge faces; of a pressure transmitting element having an inner set of wedge faces converging inwardly of the mechanism and an outer set of wedge faces diverging inwardly of the mechanism; a plurality of inner and outer friction members, said inner and outer elements having cooperating friction surfaces, said outer member having faces cooperating with the wedge faces of said cage and the outer wedge face of the pressure transmitting element and said inner wedge members having wedge faces cooperating with the inner wedge faces of said pressure transmitting element; and means for yieldingly opposing movement of the inner friction members.

9. In a friction shock absorbing mechanism, the combination with a spring cage having interior wedge faces; of a pressure transmitting element having interior inner and outer sets of wedge faces; a plurality of inner and outer friction members, said inner and outer elements having cooperating friction surfaces, said outer member having faces cooperating with the wedge faces of said cage and the outer wedge face of the pressure transmitting element and said inner wedge members having wedge faces cooperating with the inner wedge faces of said pressure transmitting element; and means for yieldingly opposing movement of the inner friction members.

10. In a friction shock absorbing mechanism, the combination with a spring cage having interior opposed faces; of a main spring resistance within the cage; a main spring follower; an auxiliary spring follower having inwardly diverging faces at the outer end thereof; an auxiliary spring resistance interposed between said auxiliary and main spring followers; a pressure transmitting element having inner and outer sets of wedge faces; a plurality of inner and outer friction members, said inner and outer members having cooperating friction surfaces, said outer members also having wedge faces cooperating with the outer wedge faces of said pressure transmitting element and the faces of said spring cage, said inner members having wedge faces cooperating with the inner wedge face of said pressure transmitting member, and the inwardly diverging faces of said auxiliary spring follower.

11. In a friction shock absorbing mechanism, the combination with a column element having converging interior wedge faces; of a front follower acting element having a plurality of wedge faces thereon; differential friction elements interposed between the wedge faces of said follower and spring cage; a spring follower cooperating with the differential friction elements; a second spring follower normally spaced from said first named spring follower to provide a predetermined amount of initial action; a main spring resistance element cooperating with said second named spring follower and an auxiliary spring resistance interposed between the first and second named spring followers.

In witness that I claim the foregoing I have hereunto subscribed my name this 12th day of March 1925.

STACY B. HASELTINE.